A. STABLES.
COTTON LINT COLLECTOR.
APPLICATION FILED NOV. 27, 1920.
1,396,673. Patented Nov. 8, 1921.
2 SHEETS—SHEET 2.
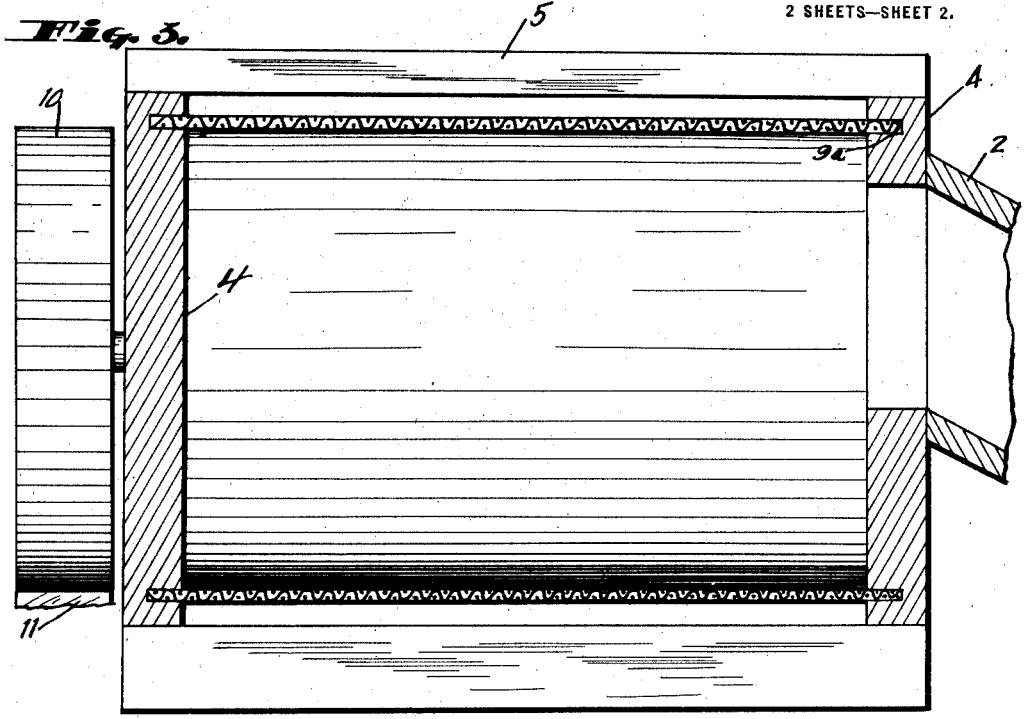
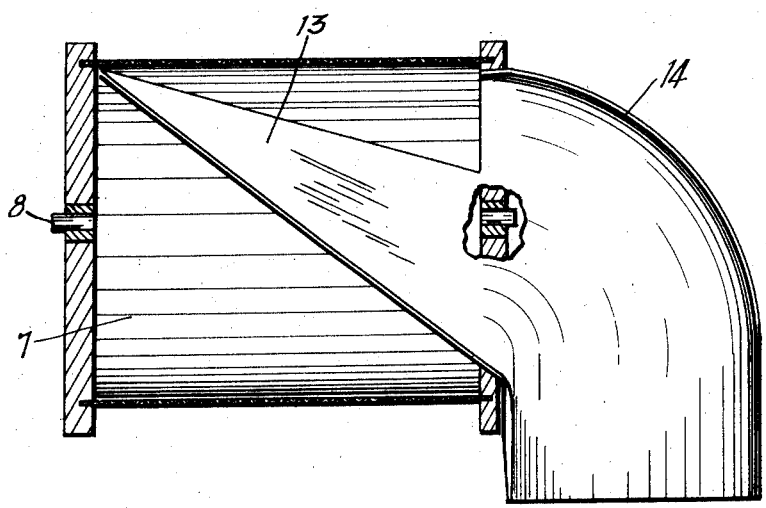
INVENTOR
Arthur Stables.
by Hozard & Miller
ATTYS.

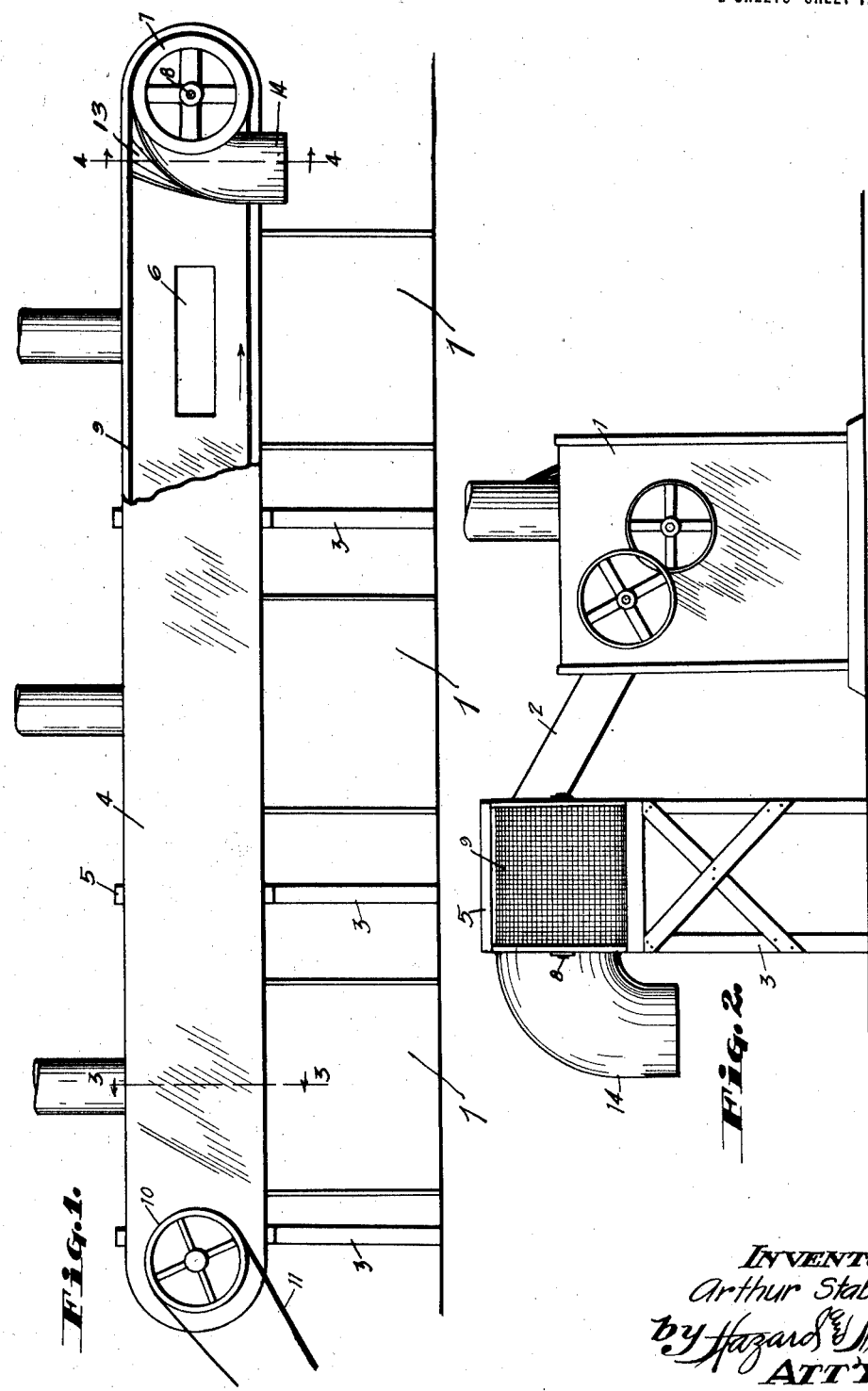

UNITED STATES PATENT OFFICE.

ARTHUR STABLES, OF LOS ANGELES, CALIFORNIA.

COTTON-LINT COLLECTOR.

1,396,673.   Specification of Letters Patent.   Patented Nov. 8, 1921.

Application filed November 27, 1920. Serial No. 426,823.

*To all whom it may concern:*

Be it known that I, ARTHUR STABLES, a citizen of the United States, residing at Los Angeles, in the county of Los Angeles and State of California, have invented new and useful Improvements in Cotton-Lint Collectors, of which the following is a specification.

It is the object of this invention to provide a lint collector employed in connection with cotton gins and the like, the collector being arranged to coöperate with a plurality of gins for collecting the lint, compressing the same and discharging the lint through a suitable offtake.

The invention will be readily understood from the following description of the accompanying drawings, in which:

Figure 1 is a side elevation of the lint collector partly broken away and showing the cotton gins with which it is employed.

Fig. 2 is an end view of the same.

Figs. 3 and 4 are detail transverse sections on the lines 3—3 and 4—4 of Fig. 1.

The lint collector may be employed in connection with one or more cotton gins and the like, and in the present embodiment of the invention I have shown a collector arranged for use with a plurality of gins of usual construction shown at 1 and each having a lint discharge 2.

The lint collector extends along side of the gins with which it is employed, and may be mounted upon a suitable supporting frame 3. The collector comprises side walls 4 extending upwardly in transverse spaced relation from the supporting frame and braced by the cross pieces 5. The side wall turned toward the cotton gins is provided with suitable openings 6 to which the discharge conduits 2 are connected.

Rollers 7 are journaled between the side walls 4 at the respective ends of the latter as by the bearings 8, and an endless screen 9 is received over these rollers so as to form upper and lower flights providing a closure for the top, bottom and ends of the collector casing. This endless screen is guided in grooves 9ª formed in the inner surfaces of side walls 4.

A suitable driving connection is provided for rotating one of the rollers, said driving connection being shown as comprising a pulley 10 positioned upon the outside of one of the side walls 4, and fixed to the shaft of one of the rollers. The pulley is rotated by a belt 11 driven by any suitable means.

The endless screen 9 is arranged to move in the direction indicated by the arrow in Fig. 1, and an offtake from the screen is arranged at the upper flight of the latter at the beginning of the upper flight just as the screen passes beyond one of the rollers. This offtake is shown at 13 as a trough extending transversely of the collector. The trough is inclined downwardly from the screen adjacent the roller at one side of the screen to an enlarged discharge for the trough at the opposite side of the screen. A discharge conduit 14 connects with the discharge of the trough and extends outwardly from the collector casing. The lint discharged through this conduit may be removed in any suitable manner.

It will be understood that the lint is forced into the collector casing between the flights of endless screen 9, and the air pressure will discharge the lint against the screen. The lint against the upper flight of the screen will fall to the lower flight, thereby keeping unobstructed air passages through the upper flight, so that a draft of air may be maintained. The lint upon the lower flight is compressed as it passes between the screen and the roller 7, and this compressed lint is discharged through offtake trough 13 just beyond the compressing roller.

It will thus be seen that I have provided a lint collector in which the lint from a plurality of cotton gins and the like, may be conveyed to compressing means, and the compressed lint then discharged through a common offtake. It will also be noted that the collector is so arranged as to maintain an air discharge through the same, so as to insure a draft. By this arrangement the lint will not clog the collector even though a large amount of lint is conveyed by the device.

Various changes may be made without departing from the spirit of the invention as claimed.

What is claimed is:

1. A lint collector comprising an endless moving screen, compressing rollers having said screen mounted on the same, means for collecting lint between the flights of said screen, and an offtake from said screen arranged to receive the compressed lint after the latter has passed over one of said rollers.

2. A lint collector comprising a casing including side walls, compressing rollers between said walls, an endless screen mounted upon said rollers so as to form spaced flights closing the top, bottom, and ends of said casing, means for collecting lint in said casing between the flights of said screen, and an offtake coöperating with the upper flight of said screen and arranged to receive the compressed lint after the latter has passed over one of the compressing rollers.

In testimony whereof I have signed my name to this specification.

ARTHUR STABLES.